United States Patent
Aigo

(10) Patent No.: US 7,512,753 B2
(45) Date of Patent: Mar. 31, 2009

(54) DISK ARRAY CONTROL APPARATUS AND METHOD

(75) Inventor: Takao Aigo, Tokyo (JP)

(73) Assignee: NEC Corporation, Tokyo (JP)

( * ) Notice: Subject to any disclaimer, the term of this patent is extended or adjusted under 35 U.S.C. 154(b) by 287 days.

(21) Appl. No.: 10/750,954

(22) Filed: Jan. 5, 2004

(65) Prior Publication Data

US 2004/0162941 A1 Aug. 19, 2004

(30) Foreign Application Priority Data

Feb. 18, 2003 (JP) .............................. 2003-039185

(51) Int. Cl.
*G06F 12/00* (2006.01)

(52) U.S. Cl. .................... 711/158; 711/114; 711/118

(58) Field of Classification Search .................. 711/113
See application file for complete search history.

(56) References Cited

U.S. PATENT DOCUMENTS

| | | | | | |
|---|---|---|---|---|---|
| 5,367,656 | A | * | 11/1994 | Ryan | 711/213 |
| 5,394,531 | A | * | 2/1995 | Smith | 711/136 |
| 5,542,088 | A | * | 7/1996 | Jennings et al. | 718/103 |
| 5,608,890 | A | * | 3/1997 | Berger et al. | 711/113 |
| 5,787,467 | A | * | 7/1998 | Abe | 711/118 |
| 5,867,735 | A | * | 2/1999 | Zuravleff et al. | 710/52 |
| 5,881,266 | A | * | 3/1999 | Matsumoto | 711/134 |
| 5,906,000 | A | * | 5/1999 | Abe et al. | 711/151 |
| 6,085,287 | A | * | 7/2000 | O'Neil et al. | 711/113 |
| 6,128,672 | A | * | 10/2000 | Lindsley | 710/19 |
| 6,308,245 | B1 | * | 10/2001 | Johnson et al. | 711/159 |
| 6,351,844 | B1 | * | 2/2002 | Bala | 717/128 |
| 6,557,079 | B1 | * | 4/2003 | Mason et al. | 711/137 |
| 6,604,174 | B1 | * | 8/2003 | Dean et al. | 711/131 |
| 2001/0042090 | A1 | * | 11/2001 | Williams | 709/102 |
| 2003/0172104 | A1 | * | 9/2003 | Hooman et al. | 709/103 |
| 2003/0188013 | A1 | * | 10/2003 | Nishikado et al. | 709/238 |
| 2004/0117791 | A1 | * | 6/2004 | Prasad et al. | 718/100 |

FOREIGN PATENT DOCUMENTS

| | | |
|---|---|---|
| EP | 0400500 A2 * | 12/1990 |
| JP | 4-137046 | 5/1992 |
| JP | 5-71948 | 9/1993 |
| JP | 6-12395 | 1/1994 |
| JP | 8-77025 | 3/1996 |
| JP | 10-63576 | 3/1998 |

* cited by examiner

*Primary Examiner*—Pierre-Michel Bataille
*Assistant Examiner*—Michael C Krofcheck
(74) *Attorney, Agent, or Firm*—Young & Thompson

(57) ABSTRACT

A disk array control apparatus determines-whether or not a I/O process request from a host computer is causing a cache hit at a disk cache memory. The apparatus identifies the I/O process request as either high priority task or low priority task. The apparatus calculates a cache hit ratio. The apparatus executes only the high priority tasks when the cache hit ratio is high and executes both the high priority tasks and the low priority tasks when the cache hit ratio is low.

9 Claims, 4 Drawing Sheets

DISK ARRAY CONTROL APPARATUS AND METHOD

BACKGROUND OF THE INVENTION

The present invention relates to a disk array which attempts to increase data transfer speed and data faults by connecting a plurality of the disk apparatus in parallel to control the entire system, and more specifically, it relates to a control apparatus and the like, which are used for a disk array.

In order to improve processing capacity for a writing/reading request from a host computer, a disk array executes a large number of writing/reading processes (hereinafter, referred to as I/O process) simultaneously. To realize this, it is often the case that the disk array performs multitask processes by using a real time OS and the like on firmware (see Japanese Patent laidopen No 5-287849 and Japanese Patent laidopen No 5-298122, for example). The multitask process is a process in which a plurality of tasks (modules for executing some series of processes) operate independently and, at the same time, a large number of tasks operate, thereby improving a processing capacity. According to this multitask process, since each task may execute one I/O process or a plurality of tasks can simultaneously execute a given I/O process, the rate of I/O processing capacity per unit of time is improved. In general, the multitask process with the real time OS is allowed to execute a plurality of tasks simultaneously by having a control memory area for each task in a local memory.

On the other hand, in the disk array of recent years, an attempt has been made to improve the performance by mounting a processor cache memory on a processor. That is, when access is repeatedly provided to the same memory area of the local memory, the data (such as micro programs, control information and the like) are held on the processor cache memory, which is fast in access speed. From the second access onward, the data on the processor cache memory is used. In this way, since the frequency of access to the local memory is reduced, processing speed of the processor is improved. As for a storage system of the data to the processor cache memory, a LRU (Least Recently Used) system is used in general. When there is no block available for storing data in the processor cache memory, the LRU system pages out that data block for which the longest time has elapsed since its most recent access.

In a multitask process, a memory area is allocated to every task. The memory area allocated to a task is named task memory. Accordingly, all the task memories can be stored within the processor cache memory when the number of tasks is small. Therefore, since it is sufficient for the processor to access only to the processor cache memory, the processor can process data at high speed. However, since the disk array is required to multi-execute the I/O process requests from a host computer, it is necessary that a large number of tasks are executed simultaneously to improve I/O processing speed. On the other hand, all the task memories cannot be stored within the processor cache memory when the number of tasks becomes large and, therefore, the paging out occurs frequently. This leads to lowering the processing speed of the processor. That is, there is a trade-off between the I/O processing speed and the processing speed of the processor. The trade-off for situations where a cache hit of a disk cache memory occurs and a cache miss hit occurs is described below. Note that the disk cache memory is a memory to hold data that are often used among data written/read from the host computer for the disk apparatus.

When there exists accessed data within the disk cache memory of the disk array when a reading request from the host computer is made, namely when "cache hit" occurs, there is no need to access to the disk apparatus and, therefore, there is no need to consider the I/O processing speed. Accordingly, it is effective to decrease the number of tasks so as to improve the processing speed of the processor.

On the other hand, when the data is read from the disk apparatus because the requested data is not within the disk cache memory, namely when a "cache miss hit" occurs, since it takes long time to execute one I/O process, it is necessary that the number of tasks is sufficient to improve overall I/O processing speed.

In this way, when the number of tasks is decreased in order to improve the processing speed of the processor upon a cache hit, the I/O processing speed upon a cache miss is lowered. On the other hand, when the number of tasks is increased contrariwise to improve the I/O processing speed upon a cache miss, the processing speed of the processor ends up being lowered upon a cache hit.

SUMMARY OF THE INVENTION

It is an object of the present invention to provide a disk array control apparatus which can improve processing speed of the disk array as a whole, with respect to both cache hits and cache misses.

According to one aspect of the present invention, a disk array control apparatus is provided which comprises: a first element which calculates a cache hit ratio at a disk cache memory; and a second element which adjusts the number of tasks to be executed according to the cache hit ratio.

According to another aspect of the present invention, a disk array control apparatus is provided which comprises: a first element which calculates a cache hit ratio at a disk cache memory; and a second element which executes only high priority tasks when the cache hit ratio is high and executes both high priority tasks and low priority tasks when the cache hit ratio is low.

According to another aspect of the present invention, a disk array control apparatus is provided which comprises: a first element which calculates a cache hit ratio at a disk cache memory; and a second element which executes only high priority tasks when the cache hit ratio is high and executes both high priority tasks and low priority tasks when the cache hit ratio is low.

Other and further objects of this invention will be more apparent upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

For a better understanding of the invention as well as other objects and features thereof, reference is made to the following detailed description to be read in conjunction with the accompanying drawings, wherein.

DETAILED DESCRIPTION OF THE PREFERRED EMBODIMENTS

A first embodiment of a disk array control apparatus according to the present invention will be described below with reference to the drawings.

Figure 1:
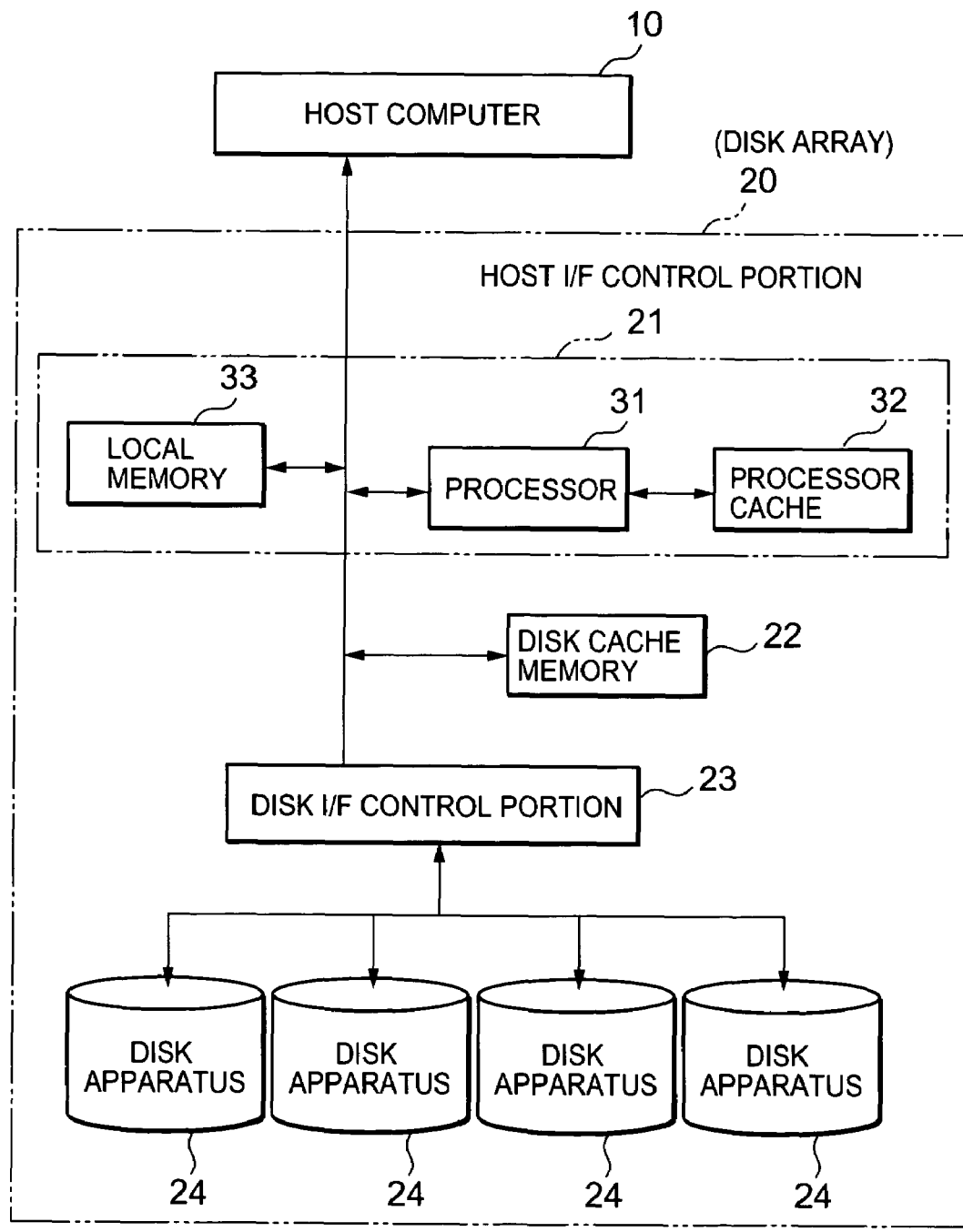
FIG. 1 is a block diagram outlining a configuration of a disk array apparatus according to embodiments of the present invention.

As shown in FIG. 1, a disk array 20 includes a host I/F control portion 21, a disk cache memory 22, a disk I/F control portion 23, a plurality of disk apparatus 24, and the like. A host I/F control portion 23 includes a processor 31, a processor cache memory 32 and a local memory 33, and executes a multitask process for the disk array 20 based on an I/O process (writing/reading) request outputted from a host computer 10. The processor cache memory 32 holds programs and control information necessary for the execution of each process, while replacing them with those having a high frequency of usage.

The disk array 20 processes the I/O process request from the host computer 10 at the host I/F control portion 21. The host I/F control portion 21 executes the I/O process by the multitask process.

When the disk array 20 receives a writing request from the host computer 10, the host I/F control portion 21 writes the data in the disk cache memory 22 and, after that, sends a completion report to the host computer 10. Further, the disk I/F control portion 23 writes the data for writing stored in the disk cache memory 22 to the disk apparatus 24, asynchronous to the request from the host computer 10. Further, when the disk array 20 receives a request for reading the data from the host computer 10, the disk I/F control portion 21 checks whether or not the requested data exists within the disk cache memory 22 and, if the data exits (cache hit), transmits the data within the disk cache memory 22 to the host computer 10. On the other hand, when the requested data does not exist within the disk cache memory 22 (cache miss), the host I/F control portion 21 notifies the disk I/F control portion 23 of a data reading instruction from the disk apparatus 24. The disk I/F control portion 23, which is notified of the instruction, reads out the requested data from the disk apparatus 24 and writes it within the disk cache memory 22 and makes a completion report to the host I/F control portion 21. The host I/F control portion 21, which receives the completion report from the disk I/F control portion 23, transmits the data stored in the disk cache memory 22 to the host computer 10 and makes a completion report thereto.

The host I/F control portion 21 has the local memory 33 and holds micro codes for operating the processor 31 and control information for executing the I/O process. Further, the processor 31 is connected to the processor cache memory 32 to attempt to speed up the process. That is, when access is repeatedly provided to the same memory area within the local memory 33, the data is moved on to the processor cache memory 32, which is fast in access speed. After the second access onward, the data on the processor cache memory 32 is used, thereby reducing the frequency of access to the local memory 33 and improving the performance. As for a storing system of the data to the processor cache memory 32, the above-mentioned LRU (Least Recently Used) system is used.

Figure 2:
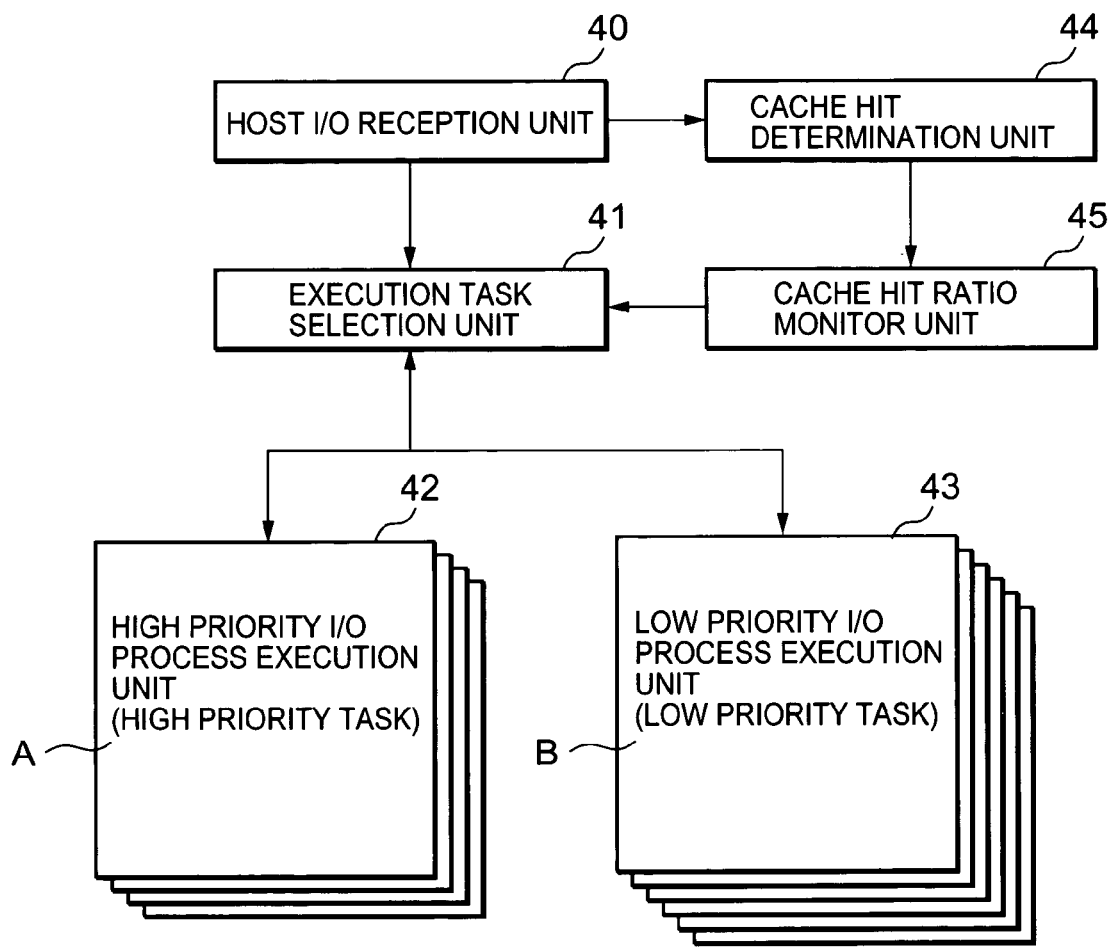
FIG. 2 is a block diagram showing a configuration according to a first embodiment of the present invention.

The configuration of the host I/F control portion 21 will be described with reference to FIG. 2. As shown in FIG. 2, the host I/F control portion 21 comprises a host I/O reception unit 40, a execution task selection unit 41, a high priority I/O process execution unit (a plurality of high priority tasks A) 42, a low priority I/O process execution unit (a plurality of low priority tasks B) 43, a cache hit determination unit 44, and a cache hit ratio monitor unit 45.

The host I/O reception unit 40 receives an I/O process request from the host computer 10 (see FIG. 1), analyzes its content and passes the I/O process request to the execution task selection unit 41 and the cache hit determination unit 44.

Figure 3:
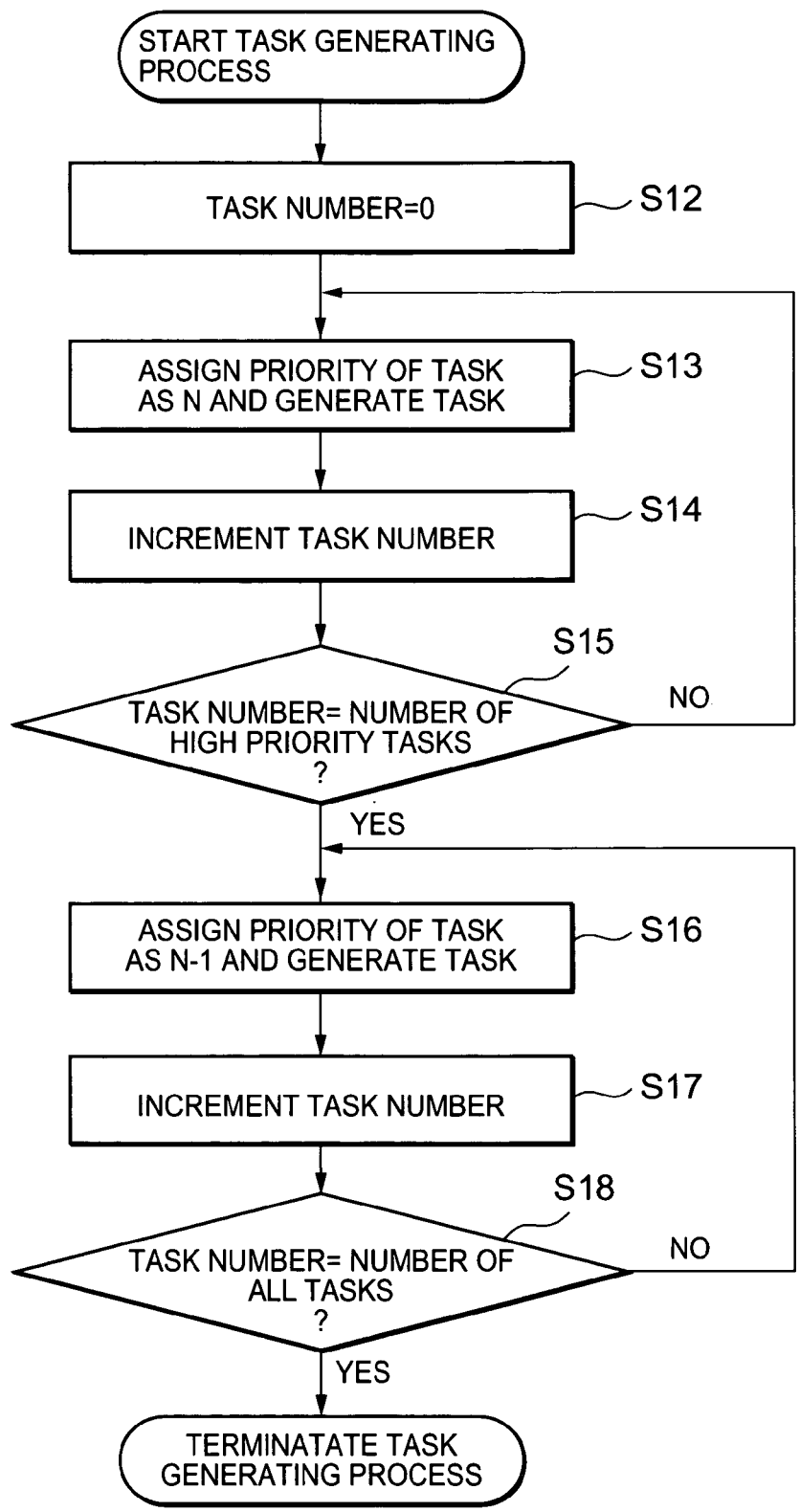
FIG. 3 is a flowchart showing task generating process in a host I/F control portion of FIG. 2.

The high priority I/O process execution unit 42 executes high priority tasks with priority over low priority tasks. The low priority I/O process execution unit 43 executes low priority tasks. The low priority tasks B are set up such that the task priority is one level lower than the high priority tasks A. FIG. 3 is a flowchart showing a task generating process by which the high priority tasks A and the low priority tasks B are generated. In the step S12, the task number is taken as 0. In the step S13, the task priority is assigned as N (high priority) so as to generate the high priority task A. In the step S14, the task number is incremented. In the step S15, it is determined whether or not the task number equals some prescribed number of high priority tasks. When the task number is less than the prescribed number, the task priority is taken as N in the step S13. When the task number equals the prescribed number, the task priority is taken as N−1 (low priority) so as to generate the low priority task B in the step S16. In the step S17, the task number is incremented. In the step S18, it is determined whether or not the task number equals some prescribed number of all tasks. This is repeated until the task number equals the prescribed number of all tasks so as to generate the low priority task B. In this way, the high priority tasks A having a priority N and the low priority tasks B having a priority N−1 are generated.

The cache hit determination unit 44 determines whether or not the I/O process request received from the host I/O reception unit 40 causes a cache hit. "Cache hit" means that the data of the address corresponding to the host I/O request exists on the disk cache memory 22 (see FIG. 1).

The cache hit ratio monitor unit 45 monitors the cache hit ratio over some period of time, that is, the number of I/O process requests resulting in a cache hit divided by the total number of I/O process requests, by using the determination result of the cache hit determination unit 44, and notifies the execution task selection unit 41 of the cache hit ratio.

The execution task selection unit 41 decides the priority of the I/O process request received from the host I/O reception unit 40. Specifically, the execution task selection unit 41 assigns the I/O process request as the high priority task when the number of the high priority tasks in execution is less than a constant number, and as the low priority task when the number of the high priority tasks in execution matches the constant number. That is, the execution task selection unit 41 places the I/O process request as the high priority task when there exists the high priority task A which does not execute the I/O process request, and as the low priority task when all the high priority tasks A are in the midst of executing the I/O process requests. Then, the execution task selection unit 41 allocates the high priority task to the high priority I/O process execution unit 42 and allocates the low priority task to the low priority I/O process execution unit 43.

Further, the execution task selection unit 41 adjusts the number of activations of the high priority I/O process execution unit 42 and the low priority I/O process execution unit 43 in response to the cache hit ratio notified from the cache hit ratio monitor unit 45. That is, when the cache hit ratio is not less than some prescribed value, activated tasks are limited to the high priority tasks. Namely, only the high priority I/O process execution unit 42 is activated. When the cache hit ratio is less than the prescribed value, all tasks comprising the high priority tasks and the low priority tasks are activated.

Namely, both the high priority I/O process execution unit 42 and the low priority I/O unit 43 are activated. To sum up, the execution task selection unit 41 decreases the number of tasks to be executed when the cache hit ratio is high, and increases the number of tasks to be executed when the cache hit ratio is low.

As mentioned above, when a cache hit occurs at the disk cache memory 22, there is no need to access to the disk apparatus 24 and, therefore, there is no need to consider the I/O processing speed. Accordingly, it is effective to decrease the number of tasks so as to improve the processing speed of the processor 31. However, according to the prior art, a large number of tasks operate in order even when a cache hit occurs at the disk cache memory 22. This is because there is no priority set up in the task.

In contrast, according to the first embodiment, a small number of high priority tasks are executed when cache hits frequently occur at the disk cache memory 22. Consequently, paging out is unlikely to occur at the processor cache memory 32 when cache hits frequently occur at the disk cache memory 22, thereby improving the processing speed of the processor 31. On the other hand, as mentioned above, when a cache miss occurs at the disk cache memory 22, since it takes a long time to execute one I/O process, it is necessary that the number of tasks is sufficient to improve overall I/O processing speed. Accordingly, a large number of tasks comprising the high priority tasks and the low priority tasks are executed. Namely, a large number of tasks are simultaneously carried out, thereby improving the overall I/O processing speed.

A second embodiment of a disk array control apparatus according to the present invention will be described below with reference to the drawings.

Figure 4:
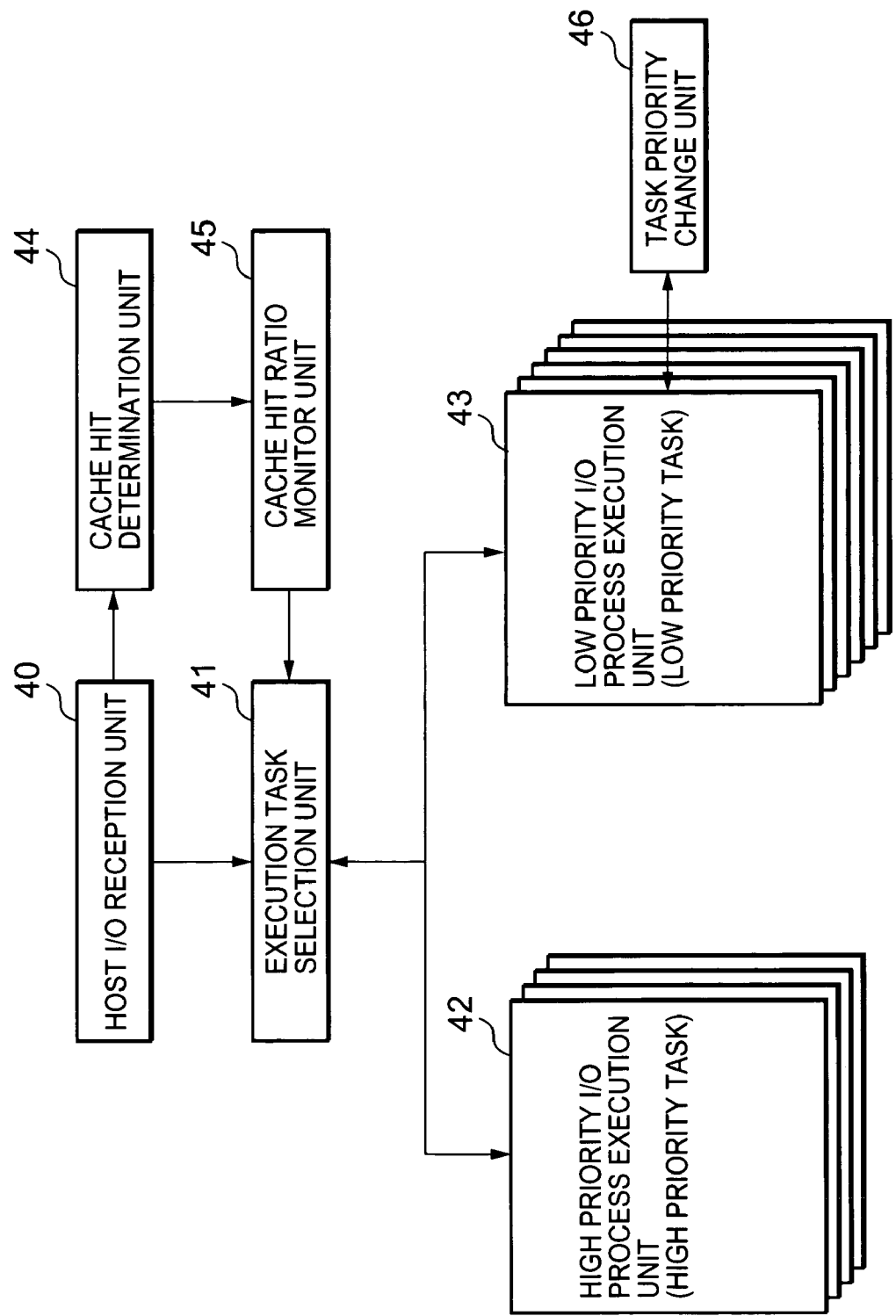
FIG. 4 is a block diagram showing a configuration according to a second embodiment of the present invention.

The configuration of the host I/F control portion 21 according to the second embodiment will be described with reference to FIG. 4. As shown in FIG. 4, the host I/F control portion 21 comprises a host I/O reception unit 40, a execution task selection unit 41, a high priority I/O process execution unit (a plurality of high priority tasks A) 42, a low priority I/O process execution unit (a plurality of low priority tasks B) 43, a cache hit determination unit 44, a cache hit ratio monitor unit 45 and task priority change unit 46. In FIG. 4, the same element as those of FIG. 2 will be given the same reference numerals and the description thereof will be omitted. The second embodiment is different from the first embodiment in that the second embodiment comprises further the task priority change unit 46.

The task priority change unit 46 dynamically changes a low priority task to a high priority task immediately after starting execution of the low priority task and changes the high priority task to the original priority task (the low priority task) at the execution termination time. When both the high priority task and the low priority task are activated, this often causes a phenomenon in which only the high priority task is advanced and the low priority task is difficult to advance, because the high priority task has priority over the low priority task. This leads to a delay of a response from the low priority task to the host computer 10. In some cases, there is a possibility that this will cause an I/O error. To avoid such a problem, in the second embodiment, the task priority change unit 46 makes the priority of the low priority task the same as that of the high priority task during the execution of the process of the low priority task. That is, the task priority change unit 46 raises the task priority by one level so as to change it to the same task priority as the high priority task A, and restores the task priority to the original priority by lowering it by one level when the low priority task B completes the I/O process. As a result of this priority change, once the low priority task starts the process, the low priority task can be advanced.

According to the above mentioned embodiments, the following advantages can be obtained.

When the cache hit ratio at the disk cache memory is high, since the number of tasks to be executed is decreased, the processing speed of the processor can be improved. On the other hand, when the cache hit ratio at the disk cache memory is low, since the number of tasks to be executed is increased, the overall I/O processing speed is improved. Furthermore, the problem that only the high priority task is advanced and the low priority task is hard to advance can be solved, since the task priority change unit makes the priority of the low priority task the same as that of the high priority task during the execution of the process of the low priority task.

Although the invention has been described in connection with preferred embodiments thereof, it is to be understood that those embodiments are set forth solely to aid in understanding the invention, and should not be read in a sense to limit the scope of the invention. Modifications of the techniques described herein will be apparent to the skilled artisan when practicing the invention, and such modifications are to be construed as falling within the scope of the appended claims.

What is claimed is:

1. A disk array control apparatus comprising:
   a control element constructed and arranged so that the control element generates multiple I/O processes for processing I/O requests to a disk array, the multiple I/O processes including first tasks with a first priority and second tasks with a second priority that is lower than the first priority, wherein an upper limit of a number of the first tasks is a first number, and wherein the first tasks and the second tasks are each I/O processes to said disk array;
   a first element constructed and arranged so that the first element calculates a cache hit ratio at a disk cache memory; and
   a second element constructed and arranged so that the second element executes the first tasks until the number of the first tasks being executed reaches the first number, and executes the second tasks and the first tasks when the number of the first tasks reaches the first number, except that the second element executes only the first tasks when the calculated cache hit ratio is above a prescribed value even if the number of first tasks reaches the first number.

2. The disk array control apparatus as claimed in claim 1, wherein a number of said I/O processes decreases when the calculated cache hit ratio is above the prescribed value and increases when the calculated cache hit ratio is below the prescribed value.

3. The disk array control apparatus according to claim 1, further comprising:
   a host I/O reception unit arranged so that the host I/O reception unit receives as an input the I/O requests from a host computer, the I/O reception unit performing content analysis upon the I/O requests, and
   wherein the first element includes
   a cache hit determination unit constructed and arranged to determine whether or not an I/O process is causing a cache hit at the disk cache memory, and
   a cache hit ratio monitor unit constructed and arranged to calculate and output the cache hit ratio within some period of time by using a determination result of the cache hit determination unit.

4. The disk array control apparatus as claimed in claim 3, further comprising:
 a task priority change unit constructed and arranged to dynamically change one of the second tasks to one of the first tasks after starting execution of the one second task, the task priority change unit changing the changed task back to one of the second tasks at execution termination time.

5. A disk array control apparatus comprising:
 a control element constructed and arranged so that the control element generates multiple I/O processes for processing I/O requests to a disk array, the multiple I/O processes including first tasks with a first priority and second tasks with a second priority that is lower than the first priority, wherein an upper limit of a number of the first tasks is a first number;
 a first element constructed and arranged so that the first element calculates a cache hit ratio at a disk cache memory; and
 a second element which executes the first tasks until a number of the first tasks being executed reaches the first number, and executes the first and second tasks when the number of the first tasks reaches the first number,
 wherein said second element executes only the first tasks when the cache hit ratio is above a prescribed value.

6. A disk array control method comprising the steps of:
 generating multiple I/O processes for processing I/O requests to a disk array, the multiple I/O processes including first tasks with a first priority and second tasks with a second priority that is lower than the first priority, wherein an upper limit of a number of the first tasks is a first number;
 calculating a cache hit ratio at a disk cache memory;
 executing the first tasks until a number of the first tasks reaches the first number; and
 executing the first and second tasks when the number of the first tasks reaches the first number, except that only the first tasks are executed when the calculated cache hit ratio is above a prescribed value even if the number of first tasks reaches the first number.

7. The disk array control method as claimed in claim 6, further comprising;
 decreasing the number of tasks being executed when the cache hit ratio is above the first number and
 increasing the number of tasks being executed when the cache hit ratio is not above the first number.

8. The disk array control method according to claim 6, further comprising the steps of:
 inputting an I/O request from a host computer;
 determining whether an I/O process is causing a cache hit at a disk cache memory; and
 calculating the cache hit ratio within some period of time based on results of the determining step.

9. The disk array control method as claimed in claim 8, further comprising the step of:
 changing one of the second tasks to one of the first tasks after starting execution of the one of the second tasks, and changing the changed task back to one of the second tasks at execution termination time.

* * * * *